April 6, 1965  B. V. VARTANIAN  3,177,128
APPARATUS FOR PRODUCING CARBON BY DIRECT HEATING
WITH RECYCLED VOLATILE BY-PRODUCTS
Filed Oct. 30, 1961
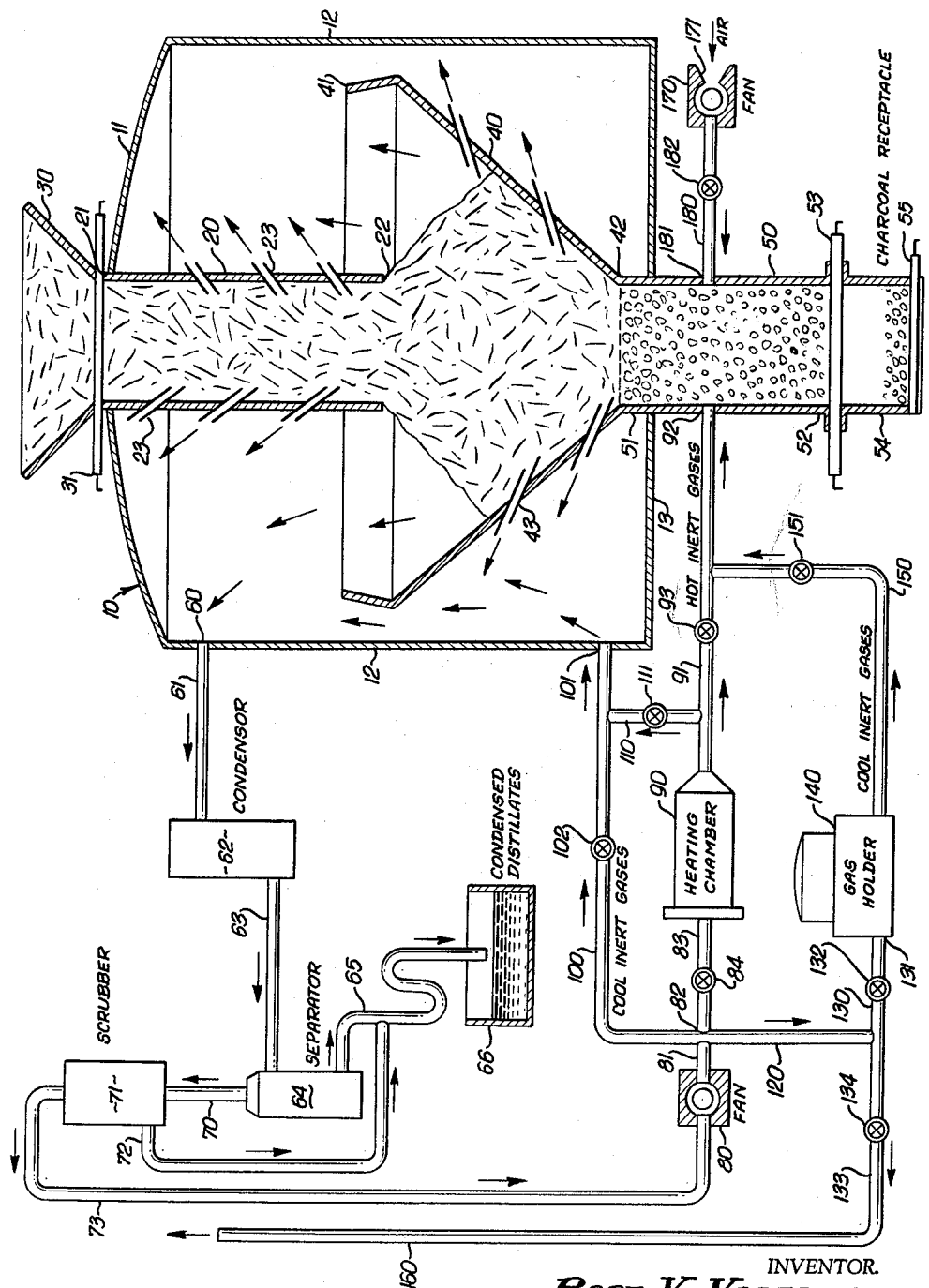
INVENTOR.
*BART V. VARTANIAN*
BY
*Huebner & Worrel*
ATTORNEYS.

United States Patent Office 3,177,128
Patented Apr. 6, 1965

3,177,128
APPARATUS FOR PRODUCING CARBON BY DIRECT HEATING WITH RECYCLED VOLATILE BY-PRODUCTS
Bart V. Vartanian, 902 Esplanade, Redondo Beach, Calif.
Filed Oct. 30, 1961, Ser. No. 148,398
13 Claims. (Cl. 202—108)

This invention relates to a method and apparatus for producing carbon and by-products thereof. It particularly relates to a process and apparatus for continuous carbonization of organic materials to produce carbon or charcoal, and to recover by-products of such process.

There are many quite elaborate methods and apparatus for continuously producing charcoal and for salvaging by-products of carbon production, but those presently available are unnecessarily elaborate and expensive, are difficult to control and operate, are slow in operation, do not permit full recovery of by-products, and often provide a relatively low yield of carbon or charcoal.

These other methods and apparatus do not take full advantage of the exothermic reaction which takes place in the decomposition of the base material itself to treat the material so as to dry it in the early stages of the process, and to aid in the thermal breakdown of the material, to crack the cellulose and lignin molecular structures of the material, and otherwise to prepare the material for the final production of a high carbon content end product.

Although some of such other processes utilize gases driven off from the base material during the preparation stage to aid, by recirculation, in the creation and maintenance of a strong exothermic reaction, they do not accomplish this with the degree of efficiency capable of attainment in the method and apparatus of the present invention.

In processes presently available it is difficult, and often impossible, to attain rapid, simple adjustment of temperature control at various stages of the carbonization process. The method and apparatus of the present invention, on the other hand, provide prompt, readily adjustable control, as desired, so that slow carbonization, and excessively rapid carbonization as well, are avoided, and a high carbon content end product is produced, while a high yield of distillate by-products is maintained.

It is therefore an object of the present invention to provide a method and apparatus for continuously producing carbon and by-products thereof in which the exothermic reaction zone of the apparatus is situated so as to take full advantage thereof, and so as to fully utilize the inert gases driven off during the process to cure and prepare the base material, and to control temperatures, while still permitting extensive recovery of by-products.

It is another object of the invention to provide such a method and apparatus which permit rapid discharge of inert gases from the base material, and the efficient recirculation of such gases to aid in the heating process.

It is still another object of the invention to provide such a method and apparatus which has simplified means for mixing hot and cool gases for purposes of rapid and accurate temperature control.

It is a further object of the invention to provide such a method and apparatus which allow accurate control of the rate of carbonization of the base material, thus assuring maximum yield of high quality carbon and charcoal, and high recovery of by-products.

It is still a further object of the invention to provide such an apparatus which is simple and relatively inexpensive to manufacture, install and maintain, but which is yet highly durable.

With these and other objects in view, the invention consists of the construction, arrangement and combination of the various parts of the device whereby the objects contemplated are attained, as hereinafter set forth, pointed out in the appended claims, and illustrated in the accompanying drawing.

The drawing is a schematic representation of the apparatus of the present invention.

A housing or container 10 is provided. Housing 10 may be of any suitable material, but steel is suggested. If desired, housing 10 may be externally insulated, but in practical operation this has not been found to be necessary. Housing 10 has a top 11 (which may be domed, as illustrated in the drawing), sides 12, and bottom 13.

Centrally, vertically disposed in housing 10, is a stack member 20, again preferably of steel. Stack 20 has an open top end 21 and an open bottom end 22. Top end 21 of stack 20 projects through a suitable opening in top 11 of housing 10, and is tightly disposed in said opening. Bottom end 22 of stack 20 is preferably disposed at approximately the mid-point of the internal vertical height of housing 10. A plurality of tubular baffles 23 is provided in the body of stack 20, and the baffles are inclined upwardly so as to aid in the discharge of inert gases from stack 20, as hereinafter mentioned.

A hopper 30 is mounted on top end 21 of stack 20. Interposed between stack 20 and hopper 30 is an air-tight valve 31.

Disposed in housing 10, in alignment with and below stack 20, is a frusto-conical bin or hopper 40, the open top portion 41 of which is substantially wider than the outside diameter of stack 20, and the lower open bottom portion portion 42 of which is preferably of substantially the same internal diameter as stack 20. Stack 20 may protrude into the open top portion 41 of hopper 40. Bottom portion 42 of hopper 40 is disposed adjacent to bottom 13 of housing 10. Hopper 40 is also preferably of steel. A plurality of tubular baffles 43 is provided in the body of hopper 40, which are inclined upwardly, similar to baffles 23 in stack 20, so as to aid in the discharge of inert gases in hopper 40.

In processing certain organic materials it may be found to be desirable to provide a longer curing and decomposition time for the materials within the housing, and before the materials are fed into the cylindrical chamber hereinafter described, where the materials will be subjected to a strong exothermic reaction and conversion to carbon, in the manner also hereinafter described. To attain that result, in lieu of the single hopper 40 herein specified, a plurality of substantially similar frusto-conical hoppers 40 may be provided, such plurality of hoppers being aligned one below the other so that materials from a higher hopper will feed into the wide open top portion 41 of the hopper immediately below it. If desired, housing 10 may be elongated to accommodate such plurality of hoppers.

An elongate cylindrical chamber 50 is mounted to bottom portion 42 of hopper 40, in alignment with stack 20. Chamber 50 is preferably of refractory material, but may be constructed of steel or other material. The upper end 51 of chamber 50 is tightly disposed in an opening in bottom 13 of housing 10. Chamber 50 projects downwardly from bottom 13 of housing 10 to an open bottom end 52, at which an air-tight valve 53 is disposed. Directly below air-tight valve 53 and in alignment with chamber 50 is an air-tight container or receptacle 54. If desired, receptacle 54 may have a discharge valve 55 adjacent its bottom, or receptacle 54 may be detachable from chamber 50. Additionally, if desirable, cool gases from a conduit 150, hereinafter described, may be introduced into receptacle 54 to cool the contents thereof.

A port 60 is provided in a side 12 of housing 10, said port 60 being disposed adjacent to top 11 of housing 10. A conduit 61 is connected to port 60. Conduit 61 leads from housing 10 to a condenser 62.

Leading from condenser 62 is a conduit 63, which is connected to a separator 64. From separator 64 a first conduit 65 leads to a distillate container 66.

A second conduit 70 leads from separator 64 to a scrubber 71. A third conduit 72 leads from scrubber 71 to a first conduit 65, preferably at a point intermediate the ends of first conduit 65.

Another conduit 73 leads from scrubber 71 to a fan 80. From fan 80 a conduit 81 leads to one side of a four-way connection 82. From another side of four-way connection 82 a conduit 83 leads to a heating chamber 90. A flow valve 84 is mounted on conduit 83 and disposed so as to control the flow of gases in conduit 83.

From heating chamber 90, a conduit 91 leads to a port 92 in chamber 50, port 92 being disposed intermediate the upper end 51 and bottom end 52 of chamber 50. A valve 93 is mounted on conduit 91 and disposed so as to regulate the flow of gases in conduit 91.

From a third side of connection 82, a conduit 100 leads to a port 101 in side 12 of housing 10, said port 101 being disposed adjacent to bottom 13 of housing 10. A valve 102 is mounted on conduit 100 and disposed so as to regulate the flow of gases in conduit 100.

A transverse conduit 110 is connected to conduit 91 and to conduit 100 intermediate the ends of said conduits 91 and 100, and a valve 111 is mounted on conduit 110 and disposed so as to regulate the flow of gases in said conduit 110.

From a fourth side of connection 82 a conduit 120 leads to a conduit 130, the connection of conduit 120 being preferably intermediate the ends of conduit 130.

One end 131 of conduit 130 leads from the connection of conduit 120 to conduit 130 to a gas holder 140. A valve 132 is mounted on conduit 130 intermediate the connection of conduit 120 to conduit 130 and end 131 of conduit 130, and said valve 132 is disposed so as to regulate the flow of gases in conduit 130.

A conduit 150 leads from gas holder 140 to conduit 91 at a point on conduit 91 intermediate valve 93 and port 92. A valve 151 is mounted on conduit 150 and disposed so as to regulate the flow of gases in conduit 150.

The other end 133 of conduit 130 leads to a conventional burning stack 160. A valve 134 is mounted on conduit 130 intermediate the connection of conduit 120 to conduit 130 and end 133 of conduit 130, and disposed so as to regulate the flow of gases in end 133 of conduit 130.

A fan 170, having an air intake 171, is connected to a conduit 180, said conduit 180 running between said fan 170 and a port 181 in chamber 50, said port 181 being preferably disposed on the side of chamber 50 opposite the side on which port 92 is disposed. A valve 182 is mounted on conduit 180 and disposed so as to regulate the flow of air from fan 170 to chamber 50.

During the operation of the apparatus of the present invention, the base material, such as wood, is continuously fed into hopper 30. By proper manipulation of airtight valve 31, said base material is continuously fed from hopper 30 into stack 20, without excessive air content, and, as carbon or charcoal is produced and discharged into receptacle 54, as hereinafter described, the base material in stack 20 will continue to flow into hopper 40, where, by reason of the frusto-conical configuration of hopper 40, and the greater width of hopper 40 at the upper end 41, said base material will spread out in hopper 40.

From hopper 40 the base material continues to flow downwardly into chamber 50.

It will be recognized that air-tight valves 31 and 53 prevent the introduction into chamber 50, hopper 40, and stack 20, as well as housing 10, of excess air. Excess air therein would cause excess combustion, resulting in the production of ash rather than carbon. In other words, the entire apparatus is shielded from the atmosphere, and the only air introduced into the apparatus is strictly regulated and controlled to produce an accurately controlled heat.

In the beginning of the operation, a fire is ignited in chamber 50, and, by the introduction of air through air intake 171, fan 170, and conduit 180, substantial heat is built up in chamber 50. Said heat will, of course, rise in chamber 50, passing into hopper 40 and stack 20, driving inert gases and volatile products from the base material through tubular baffles 43 and 23, and out of open end 41 of hopper 40, into housing 10. Said gases will be drawn off from housing 10 through port 60 into conduit 61, and then into condenser 62. After treatment in condenser 62, said gases will be drawn through conduit 63 into separator 64, in which distillate by-products will be separated from said gases, said distillate by-products passing through conduit 65 into container 66.

After leaving separator 64 through conduit 70, said gases will pass through scrubber 71, where additional distillate by-products are removed, and returned by means of conduit 72 to conduit 65, and thence to container 66.

After treatment in scrubber 71, said gases continue along conduit 73, such passage being accelerated by the action of fan 80, and pass through conduits 81 and 83 into heating chamber 90, where they are heated or burned. The hot inert gases leave heating chamber 90 by way of conduit 91 and re-enter chamber 50 through port 92. Upon entry into chamber 50 said hot gases will build up the temperature in chamber 50 and will intensify the exothermic reaction then taking place in chamber 50.

In operation it has been found to be advantageous during the continuation of the process, to maintain a minimum temperature of 1100° F. in chamber 50, although the specification of this temperature is not to be deemed to be limiting.

With this high temperature being maintained by the introduction of said hot inert gases into chamber 50, and the strong exothermic reaction which is occurring in chamber 50, the amount of air introduced into chamber 50 is reduced or eliminated. Furthermore, the high temperature maintained in chamber 50 will cause heat to rise through the base material in hopper 40 and in stack 20, and more gases and volatile products will be driven off through tubular baffles 43 and 23, and out of open end 41 of hopper 40, into housing 10, from which they pass through port 60 to continue their circulation hereinabove described.

It will be recognized that the base material in chamber 50, under these conditions of intense heat and a minimum of air, or an absence of air, is highly refractive, while the base material disposed in hopper 40 being subject, as it is, to a lower temperature, is being subjected to decomposition. Similarly, the temperature in stack 20 being somewhat less than the temperature in hopper 40, the base material in stack 20 is being subjected to drying.

Again by way of illustration and not by way of limitation, with a minimum temperature of 1100° F. being maintained in chamber 50, the range of temperature in hopper 40 will be between 400° F. and 800° F., whereas, in stack 20, the temperature will be somewhat less.

It has been found to be important, to aid in the decomposition of the base material in hopper 40 and the drying of the base material in stack 20, to maintain a temperature in housing 10, externally of hopper 40 and stack 20, of between 300° F. and 400° F. To aid in the maintenance of said temperatures in housing 10, cool inert gases in conduit 100 are mixed with hot inert gases passing from conduit 91 through conduit 110, the temperature of the mix as it enters housing 10 being controlled by means of valve 102 on conduit 100 and valve 111 on conduit 110.

Of course, the control of the temperature in chamber 50 will be the most important temperature control in the method and apparatus of the present invention, and the basic control feature for the temperature in the exothermic zone of chamber 50 is attained by regulation of valve 93 in conduit 91, and also by regulation of valve 151 in conduit 150.

The gases passing through conduit 120 and conduit 130 into gas holder 140 are cooled, and the gases passing from gas holder 140 through conduit 150 are also cool. If gases passing from heat chamber 90 through conduit 91 to port 92 become too hot, they may be cooled by the introduction of cool inert gases through circuit 150, and similarly, if the gases in conduit 91 become too cool, the supply of cool inert gases from gas holder 140 may be decreased by manipulation of valve 151.

Any excess cool inert gases may be drawn off through conduit 133, and dispersed through burning stack 160.

It will be readily seen that the method and apparatus of the present invention provide a most flexible temperature control through the entire carbonization process, not only within the exothermic zone of chamber 50, the decomposition zone of hopper 40, and the drying zone of stack 20, but also throughout the entire housing.

Of course, at any time at which it is desired to build up the temperature in chamber 50 above the normal heat of, say, 1100° F., this may be readily accomplished by opening valve 182 to introduce more air into chamber 50 by way of port 181, and consume said air in chamber 50. It will also be seen that in the apparatus of the present invention, heat is applied to the base material being treated in hopper 40 and stack 20 not only internally but also externally of said hopper 40 and stack 20, thereby accelerating the decomposition and drying processes.

It will further be seen that the multiple escape routes for the gases in the base material, and particularly the route through open end 41 of hopper 40, aid in the drying of the base material, the thermal breakdown thereof, and the cracking of cellulose and lignin molecular structures therein, resulting in rapid treatment and a very high carbon content of the end product.

The high carbon content end product is discharged from the apparatus by manipulation of air-tight valve 53, which permits the end product to drop into the receptacle 54, where it is held free of contact with the atmosphere until it has cooled sufficiently to prevent instantaneous combustion in said end product, (which would otherwise occur if the end product, at its original high temperatures, was exposed to the atmosphere).

Furthermore, the easy gas escape features of the device of the present invention make it possible to treat base organic materials, such as sawdust or refuse, which are not generally used for the production of charcoal in commercial quantities because of the difficulty of treating them due to their tendency to form a heavy, densely packed mass in the early stages of the process.

Although the invention has been herein shown and described in what is conceived to be the most practical and preferred embodiment of the invention, it is recognized that departures may be made therefrom within the scope of the invention, which is not to be limited to the details disclosed herein but is to be accorded the full scope of the claims so as to embrace any and all equivalent structures and methods.

What is claimed is:

1. Apparatus for producing carbon which comprises: a housing having an opening in the top and in the bottom of said housing; an open-ended stack disposed in the top opening in said housing and centrally in the upper portion of said housing; a first hopper for receiving organic material, said first hopper being connected to the upper end of said stack, disposed externally of said housing, and providing access for said organic material to said stack; a second hopper disposed in the lower portion of said housing below said stack for receiving organic material from said stack, said second hopper being spaced apart from the sides of said housing and having an open upper end of greater diameter than the diameter of said stack, and the lower end of said stack being disposed in the open upper end of said second hopper; a cylindrical chamber mounted on said hopper and disposed at the bottom of the housing for receiving organic material from said second hopper, said chamber projecting downwardly through the bottom opening in said housing; means for generating and controlling an exothermic heat reaction in the organic material in said chamber; means for discharging inert gases and volatile distillates from said stack and said second hopper into said housing; means for discharging said gases and distillates from said housing; means for separating said distillates from said gases; means for reheating said gases; means for introducing said reheated gases into said chamber and into said housing; and means for discharging carbonaceous residue from said chamber.

2. Apparatus as defined in claim 1, including tubular baffles mounted on said stack and on said second hopper and disposed so as to discharge inert gases and volatile distillates from said stack and from said second hopper into said housing.

3. Apparatus for producing carbon which comprises: a housing having an opening in the top and in the bottom of said housing; an open-ended stack disposed in the top opening in said housing and centrally in the upper portion of said housing; a first hopper for receiving organic material, said first hopper being connected to the upper end of said stack, disposed externally of said housing, and providing access for said organic material to said stack; a first air-tight valve disposed between said first hopper and said stack so as to control feeding of organic material from said first hopper into said stack and so as to limit the introduction of atmospheric air into said stack; a plurality of second hoppers disposed one above the other in the lower portion of said housing below said stack for serially receiving organic material from said stack, said second hoppers being spaced apart from the sides of said housing, and said second hoppers each having an open upper end of greater diameter than the diameter of said stack; a cylindrical chamber mounted on the lowest of said second hoppers, said chamber being disposed at the bottom of the housing for receiving organic material from the lowest of said second hoppers, and said chamber projecting downwardly through the bottom opening in said housing; means for generating and controlling an exothermic heat reaction in the organic material in said chamber; means for discharging carbonaceous residue from said chamber; means for discharging inert gases and volatile distillates from said stack and second hoppers into said housing; means for discharging said gases and distillates from said housing; means for separating said distillates from said gases; means for reheating said gases; means for introducing said reheated gases into said chamber and into said housing; and a second air-tight valve mounted adjacent the lower end of said chamber and disposed so as to limit the introduction of atmospheric air into said chamber.

4. Apparatus as defined in claim 3, wherein the means for discharging inert gases and volatile distillates from said housing, and the means for separating said distillates from said gases, comprise: an outlet port in said housing adjacent the top of said housing; a condenser; a conduit leading from said outlet port to said condenser; a separator; a conduit leading from said condenser to said separator; a container adapted to receive and hold distillates; a conduit leading from said separator to said container; a scrubber; a conduit leading from said separator to said scrubber; and a conduit leading from said scrubber to said container.

5. Apparatus as defined in claim 3, wherein the means for reheating said gases after separation of said distillates, comprises: a fan; a conduit leading from said scrubber to said fan; a heating chamber; a conduit leading from said fan to said heating chamber; a port in said cylindrical chamber; a conduit leading from said heating chamber to said port; and a valve disposed in said conduit between said heating chamber and said port, and adapted to control the flow of heated gases in said conduit.

6. Apparatus as defined in claim 5, including means for introducing reheated gases into said housing, which comprises: a port in said housing adjacent the bottom of said housing; a conduit leading from said heating chamber to said port; and a valve disposed on said conduit and adapted to control the flow of heated gases in said conduit.

7. Apparatus as defined in claim 5, including means for controlling the temperature of gases flowing from said heating chamber to said cylindrical chamber which comprises: a gas holder; a conduit leading from said fan to said gas holder; a valve controlling the flow of gases in said conduit leading from said fan to said gas holder; a conduit leading from said gas holder to said conduit for hot gases leading from said heating chamber to said cylindrical chamber; and a valve mounted on said conduit from said gas holder to said latter conduit, said valve being disposed so as to control the flow of gases from said gas holder to said latter conduit.

8. Apparatus as defined in claim 6, including means for controlling the temperature of gases flowing from said heating chamber to said housing which comprises: a conduit leading from said fan to the conduit leading from said heating chamber to the port in said housing; and a valve disposed on said conduit leading from said fan to the heating chamber conduit and adapted to control the flow of gases from said fan to said heating chamber conduit.

9. Apparatus as defined in claim 7, including means for exhausting gases coming from said fan which comprises: a burning stack; a conduit leading from said fan to said burning stack; and a valve mounted on said conduit and disposed so as to control the flow of said gases from said fan to said burning stack.

10. Apparatus for producing carbon which comprises: a housing having an opening in the top and in the bottom of said housing; an open-ended vertical stack disposed in the top opening in said housing and projecting downwardly in the upper portion of said housing; a hopper disposed in the lower portion of said housing below said stack for gravity flow reception of organic material deposited in said stack, said hopper being spaced apart from the sides of said housing and having an open upper end of greater diameter than said stack; a cylindrical chamber mounted on said hopper, disposed at the bottom of said housing, and projecting downwardly through the bottom opening in said housing, said chamber being disposed so as to receive organic material from said hopper by gravity flow and so as to retain said organic material; means for generating and controlling an exothermic heat reaction in said chamber; means for discharging inert gases and volatile distillates from said stack and said hopper into said housing; means for discharging said gases and distillates from said housing; means for separating said distillates from said gases; means for reheating part of said gases; means for introducing said reheated gases into said chamber and into said housing; means for controlling the temperatures of said reheated gases prior to introduction thereof into said chamber and into said housing; and means for discharging carbonaceous residue from said chamber after application of exothermic heat to the organic material therein.

11. Apparatus as defined in claim 10, wherein the means for controlling temperatures of said reheated gases comprises: means for selectively mixing cool inert gases with said reheated gases.

12. Apparatus as defined in claim 10, including means for selectively introducing air into said chamber so as to control the exothermic heat reaction in said chamber.

13. Apparatus as defined in claim 12, wherein the means for selectively introducing air into said chamber comprises: a fan having an air intake; a port in said chamber; a conduit between said fan and said port; and a flow valve mounted on said conduit.

References Cited by the Examiner

UNITED STATES PATENTS

| 2,131,702 | 9/38 | Berry | 202—19 |
| 2,289,917 | 7/42 | Lamboitte | 202—16 |
| 2,448,223 | 8/48 | Lantz | 202—16 |

FOREIGN PATENTS

| 722,459 | 5/42 | Germany. |
| 849,838 | 7/49 | Germany. |
| 487,983 | 6/38 | Great Britain. |

MORRIS O. WOLK, *Primary Examiner.*

ALPHONSO D. SULLIVAN, *Examiner.*